United States Patent [19]

Roberts

[11] 3,958,973
[45] May 25, 1976

[54] MICRONUTRIENT METAL-CONTAINING PHOSPHATE GLASSES

[75] Inventor: Gordon J. Roberts, Shaker Heights, Ohio

[73] Assignee: Ferro Corporation, Cleveland, Ohio

[22] Filed: Oct. 1, 1975

[21] Appl. No.: 618,517

Related U.S. Application Data

[62] Division of Ser. No. 407,530, Oct. 18, 1973, Pat. No. 3,930,833.

[52] U.S. Cl. ................................. 71/64 G; 71/1; 106/47 R
[51] Int. Cl.² ..................... C05G 3/00; C03C 3/16
[58] Field of Search ............. 71/1, 64 G; 106/47 R

[56] References Cited
UNITED STATES PATENTS

| | | | |
|---|---|---|---|
| 2,806,773 | 9/1957 | Pole | 71/64 G |
| 2,920,972 | 1/1960 | Godron | 106/47 R |
| 2,988,439 | 6/1961 | Gloss | 71/1 |

*Primary Examiner*—Frank A. Spear, Jr.
*Assistant Examiner*—Ferris H. Lander
*Attorney, Agent, or Firm*—Milton L. Simmons; Wesley B. Taylor

[57] ABSTRACT

Glass compositions are disclosed that are particularly useful in comminuted form as sources of micronutrient elements for soils. The glasses are based on phosphorous as $P_2O_5$ and contain a nutrient amount of a micronutrient metal in oxide form, such as zinc, copper, manganese, molybdenum, or boron oxides or mixtures thereof, plus a solubility control agent. The control agent is a metal compound or mixture of metal compounds, usually potassium or sodium oxide or potassium or sodium chloride, and is present in the glass to provide a controlled release of the micronutrient metal, both as to amount and rate.

15 Claims, No Drawings

MICRONUTRIENT METAL-CONTAINING PHOSPHATE GLASSES

CROSS-REFERENCE TO RELATED APPLICATIONS

This is a division of application, Ser. No. 407,530, filed Oct. 18, 1973, now U.S. Pat. No. 3,930,833, issued Jan. 6, 1976.

Ferrous iron-containing phosphate glasses are disclosed and claimed in an application entitled, "Micronutrient Iron-Containing Phosphate Glasses", filed Nov. 6, 1972, in the names of Gordon J. Roberts and Shelton E. Allred and assigned Ser. No. 303,830.

BACKGROUND OF THE INVENTION

The importance of minor amounts of certain elements in nutrition, such as plant nutrition, is well established. It has been demonstrated that minor amounts of such elements as iron, manganese, copper, boron, zinc, cobalt and molybdenum are all important and essential to the proper physiological functioning of plants. Since such elements are present in most soils and some of such elements are present in all soils, and since the requisite nutritional amount is quite small, it might be assumed that whatever nutritional elements might be present would be adequate for nutritional needs. However, even where a soil contains sufficient amounts of zinc and other nutrient elements, deficiencies of these elements still occur in plants growing in that soil due to chemical and physiological processes which render such elements unavailable to the plants or make them inactive in the physiological functions within the plant. Moreover, actual iron deficiency is fairly widespread in soil which is alkaline or calcareous, such as in soil roughly west of the Mississippi River, and in sandy soil such as is found in Florida.

Still further, soil conditions can affect assimilation by a plant of zinc and other nutrient elements that may be present even in adequate amounts. In particular, an alkaline soil, that is, one having an alkaline pH, is generally regarded as being more difficult from which to supply nutritional elements for plant life than from an acidic soil. For example, iron deficiency causes chlorosis in plants in which normally green leaves turn white. Lime, which is often added to soils to reduce acidity, can induce chlorosis in plants. This is thought to be due to a high calcium carbonate content of the soil which raises the pH value of the soil to such an extent that iron is precipitated and made unavailable to plants. Still other causes become important under certain conditions.

In order to combat such soil deficiencies, it has been proposed to incorporate salts of the nutrient elements into the soil. This use has been generally unsatisfactory and of limited application, since conditions existing in the soil that caused the original deficiencies still exist. To combat the influence of disturbing soil factors, resort has also been made to spraying or injection salts of the nutrient elements. Injections of the salts can generally be applied to only relatively large plants such as trees and, while generally effective on some trees, may give rise to gumming of stone fruits and is tedious to carry out. Sprays are also cumbersome and at times unsatisfactory since they are damaging at high or otherwise effective concentrations.

A much more successful technique resides in preparing fritted glasses containing nutrient elements which are added directly to the soil. Under wet or damp growing conditions, small amounts of the nutrient element are made available in the immediate vicinity of seeds and plant roots. However, it is not a simple matter to fabricate a glass for this purpose. For example, the solubility of the glass in water should be relatively small in order to prevent a quick release of nutrient elements and also to prevent them from being rendered unavailable to the plants through chemical reaction in the soil. Yet the solubility cannot be so small that the rate of release of the nutrients from the glass is inadequate for plant growth. Further, the glass must be non-toxic in high concentrations to plants or seeds, so that large amounts of the glass can be applied at one time to furnish an ample supply of the nutrient in the soil over an extended period of time. One successful fritted glass composition for this purpose is disclosed in U.S. Pat. No. 2,732,290 to Vana et al. This is a silicate based glass adapted to furnish a number of nutrient elements such as iron, manganese, copper, zinc, boron, cobalt, and molybdenum.

SUMMARY OF THE INVENTION

The principal object of the present invention is to provide novel glass compositions and, more particularly, glass compositions that are adapted to provide a number of nutrient elements, especially for plants grown in various soils including soils having both an acidic and alkaline pH.

These and related objects are realized by a phosphate-base glass containing in oxide form a nutrient amount of a micronutrient metal and a sufficient amount of a control agent to control the water-solubility of the glass. The water-solubility must be so regulated that the micronutrient metal is released from the glass at a rate within a predetermined range and over a predetermined period of time.

The micronutrient metals useful in the present invention are zinc, copper, manganese molybdenum, and boron oxides and mixtures thereof. The solubility-control agent comprises $R_2O$ or $RCl$ or mixtures thereof, in which R is potassium or sodium, provided that when the micronutrient metal is manganese, no more than 50% by weight of $R_2O$ or $RCl$ is $Na_2O$ or $NaCl$.

In some cases, still other materials may be used in conjunction with $R_2O$ or $RCl$ as the solubility-control agent, such as minor amounts of $B_2O_3$, $CaO$, $SiO_2$, etc. With oxides of zinc, copper, manganese, or molybdenum, the difficulty in achieving proper water-solubility of the glass lies in making the glass more water soluble. With an oxide of poron, the difficulty is just the reverse. Glasses with $B_2O_3$ are usually too water soluble, and the solubility must be somehow sufficiently reduced to make the glass composition useful by having a slow release of the nutrient metal as herein contemplated.

In prior glasses having nutrient elements, the significance of the oxidation state of certain elements has not been realized or controlled. The valency state of a nutrient element of variable valency like manganese and iron has been found to be important. For example, $Fe^{2+}$ and $Mn^{2+}$ are both much more easily assimilated by plants than the more common forms $Fe^{3+}$ and $Mn^{3+}$. Silicate and borate-based glasses, that is, glass compositions in which these oxide formations comprise the principal ingredient, have not been entirely satisfactory as glass bases for micronutrient elements. Moreover, silicate and borate-based glasses are basically oxidizing systems. Accordingly, if manganese or iron of variable valency is dissolved in such a glass, at least the majority if not all of it is present in a higher valence form. Silicate and borate-base glasses are, therefore, handicapped in releasing the preferred ferrous form of iron or manganous form of manganese, since such glasses must somehow undergo a rather vigorous chemical reduction to provide an element of variable valence in the lower valence state.

The present glasses may be conventionally prepared by heating a mixture of batch ingredients in the proper weight ratios which upon smelting convert to the form and amount desired in the ultimate glass. As a nutrient, the glass preferably should be comminuted for admixture with a soil to be enriched. This is conventionally accomplished by fritting the glass melt after its formation by known techniques and subsequently grinding.

In use, the present glasses have a desired rate of release of the micronutrient metal over a period of time. Aqueous leaching as by soil water produces an extract having an acidic pH. This is particularly significant in soils having an alkaline pH which militate against assimilation by plants of the micronutrient metal components. In the present invention, the acid extract provides isolated pockets of less alkaline or even acidic microenvironment around roots of plants or around seeds and in this manner can nourish the plants or seeds with the desired micronutrient metals.

DESCRIPTION OF THE PREFERRED EMBODIMENTS

The concept of the present glasses, which are adapted in comminuted form to serve as a micronutrient in both acidic and alkaline soils, resides in:

1. A phosphate-base glass, present as $P_2O_5$,
2. Having a nutrient amount of a metal oxide selected from the group consisting of the oxides of zinc, copper, manganese, molybdenum, boron and mixtures thereof,
3. In which the water-solubility of the glass (representing conditions extant in soils) is controlled by an agent comprising an alkaline oxide and/or alkaline chloride, so that the micronutrient metal has a controlled release to the soil both in amount and rate.

Within the use of the metal oxides specified and control agents defined, the compositional limits of a phosphate-base glass having these components and designed for nutritional enrichment of soils can easily be determined by trial and error. Naturally, the more nutrient metal present without upsetting the glass technology, the better. Preferred ranges for each metal oxide of these phosphate glasses comprise the following in weight percent. Except as may be noted, it is understood that the Control Agent is $R_2O$ or $RCl$ in which R is potassium or sodium. $Na_2O$ and $NaCl$ normally render the glasses less water soluble than $K_2O$ or $KCl$, respectively. In the case of phosphate-base glasses containing manganese oxide, $R_2O$ or $RCl$ should contain no more than 50% by weight of $Na_2O$ or $NaCl$.

| PHOSPHATE-ZINC OXIDE GLASSES | |
|---|---|
| $P_2O_5$ | 25% to 65% |
| Zinc Oxide | 30% to 60% |
| Control Agent | 5% to 20% |

As a modified embodiment of the phosphate-zinc oxide glasses, the Control Agent may include up to 5% by weight of $B_2O_3$. This modification makes the glasses more water soluble. As a still further modification, the Control Agent for phosphate-zinc oxide glasses may include up to 15% by weight of $CaO$ or $SiO_2$ or mixtures thereof. Alternatively, the additions of two or more of $B_2O_3$, $CaO$, and $SiO_2$ may be simultaneously made in the same compositions.

| PHOSPHATE-COPPER OXIDE GLASSES | |
|---|---|
| $P_2O_5$ | 25% to 65% |
| Copper Oxide | 30% to 65% |
| Control Agent | 5% to 10% |

| PHOSPHATE-MANGANESE OXIDE GLASSES | |
|---|---|
| $P_2O_5$ | 30% to 55% |
| Manganese Oxide | 30% to 70% |
| Control Agent | 0.5% to 15% |

| PHOSPHATE-MOLYBDENUM OXIDE GLASSES | |
|---|---|
| $P_2O_5$ | 20% to 60% |
| Molybdenum Oxide | 10% to 35% |
| Control Agent | 15% to 30% |

As a modified embodiment of a phosphate-molybdenum oxide glass, the Control Agent may include up to 10% by weight of $CaO$.

| PHOSPHATE-BORON OXIDE GLASSES | |
|---|---|
| $P_2O_5$ | 5% to 20% |
| $B_2O_3$ | 30% to 65% |
| First Control Agent | 15% to 30% |
| Second Control Agent | 5% to 20% |

In the case of phosphate-boron oxide glasses, the first control agent is $R_2O$ or $RCl$ as previously defined. However, it is preferred to use an additional or second control agent in combination with the first comprising $CaO$ or $SiO_2$ or mixtures thereof. Adventitious impurities may also be present.

The present glasses may be prepared from any batch ingredients which upon smelting yield the indicated glass compositions. While the following examples list certain batch formulations that are useful, it is understood that still other compounds of the desired metals may be used initially, as long as they decompose or otherwise convert to the ultimate desired form as a result of smelting, taking into account normal losses due to smelting emissions. Impure raw materials may be used, so long as the impurities do not detract from the desirable solubility characteristics of the product.

The selected batch ingredients are thoroughly mixed and then smelted by standard techniques. The present glasses fuse in the range of about 1000°C to about 1400°C. When the entire mass becomes molten, it is fritted. That is, the molten glass is quickly quenched causing it to shatter into relatively small solid chunks because of strains created within the vitreous mass. Fritting may be accomplished by running the molten mass into water, or by running it between steel rolls, or by still other known means.

The fritted glass may now be used as a source of nutrient ferrous iron. When the glass is to be placed in soil for enriching its plant life, the frit is preferably comminuted. As an example, the comminuted glass may have a maximum particle size of about 90 percent through a 20 U.S. Standard mesh screen to a minimum particle size of about 90 percent through a 200 U.S. Standard mesh screen. The comminuted glass should be placed in the soil as near as possible to the plant roots or seeds in view of the limited mobility of iron in soil.

The following nutrient metal extraction test for the present glasses was followed except for those containing boron as the nutrient. The extraction test for the boron glasses is described in examples given for those glasses. A glass frit having a particle size of minus 200 to plus 325 mesh, U.S. standard sieve, was washed on a 325 mesh screen and dried. From the frit so prepared, two samples of 0.2 gram each were placed in two different one-liter flasks. The extraction solutions for the two flasks consisted of dilute ammonium acetate having two different pH values. The extraction solutions were prepared by adding 6.25 ml of glacial acetic acid to each of two different 230 ml volumes of distilled water and adjusting with concentrated ammonium hydroxide and additional distilled water to a volume of 250 ml, so that the pH values of the two solutions were 5.7 and 8.0, respectively. Also, a similar test can be carried out on a 0.2 gram sample of the frit when ground to a fineness suitable for application to the soil. This is referred to herein as "as ground".

The two adjusted charges of 250 ml each were then added to each of the two one-liter flasks containing the sample glass frit under test. The stoppered flasks were then uniformly shaken for 16 hours at room temperature (70°F to 75°F) by a mechanical Burrell wrist action shaker. A 0.5 inch ashless paper plug and a porcelain filter plate were placed sequentially in the neck of a suction flask. For each liter flask containing a test glass composition, about 20 ml of the slurry produced in the liter flasks was passed through the plug and then discarded. This step was repeated once more before the remaining slurry was filtered, applying just enough suction to obtain a broken flow of filtrate into the suction flask. This produced a clear filtrate. The nutrient metal content of the resulting filtrate was determined by either atomic absorption or colorimetric analysis. Here and in the claims, this extraction test is referred to as the "ammonium acetate extraction test". In the following examples, the extraction result is given as weight percent of the sample tested.

Another important attribute of the present glasses is the pH developed upon water contact, simulating that which occurs in wet or damp soil. In the present case, the glasses provide an acidic extract. Thus, the glasses are useful not only in acidic soils but, more significantly, in alkaline soils as well. In an alkaline soil, an acidic, aqueous leach or extract of the glass helps maintain the immediate surroundings of the frit particles less alkaline than the bulk of the soil or even provides an actual acidic microenvironment adjacent the plants and seeds. In either case, the pickup of nutrient metal by the plants and seeds is facilitated.

A 1:1 weight ratio of frit:water was used to determine the pH of the extract solution. The mixture was stirred for five minutes and the pH then determined on the resulting slurry by conventional means. Under these test conditions, glasses of the present invention gave acidic water extracts ranging from a pH from about 2.0 to a pH of about 5.3.

The following examples are intended only to illustrate the invention and should not be construed to impose limitations on the claims. Compositions are by weight unless otherwise indicated, and mesh sizes are U.S. Standard sieve.

EXAMPLE 1

Examples 1 through 14 illustrate phosphate-zinc oxide glasses. A glass was prepared having this composition in weight percent:

| | |
|---|---|
| ZnO | 49.1% |
| $B_2O_3$ | 6.3% |
| $P_2O_5$ | 35.3% |
| KCl | 9.5% |

This glass melted easily at 900°C to 1000°C to form a homogenous liquid which was then quenched and ground. The relatively low fusion temperature of this composition is important in that it tends to reduce the loss of zinc oxide by volatilization. A typical set of solubility results of this glass composition when fritted is shown by Table A. These extraction tests were carried out on an "as-ground" basis, that is, without segregation based on particle size, using 5 grams of sample in 250 milliliters of buffer for 16 hours.

TABLE A

| Extraction pH | ppm Zn in Extract | % Zn Extracted of Total Wt. | % Zn Extracted of Total Zn |
|---|---|---|---|
| 5 | 830 | 4.2 | 10.5 |
| 6 | 430 | 2.2 | 5.5 |
| 7 | 100 | 0.5 | 1.25 |
| 8 | 260 | 1.3 | 3.25 |

It will be noticed that the extractability of the zinc is lowest at pH 7, but at a pH of 8 the solubility has again increased to a greater level. A silicate-based glass would not have shown this recovery in extractability.

The glass of this example may be considered to be a chloroborophosphate. In this case, the chlorine also played a significant role in rendering soluble in the melt the relatively large amount of zinc oxide present.

EXAMPLE 2

A glass was prepared from this batch formulation:

| | |
|---|---|
| Zinc Oxide | 57.13 grams |
| Powdered Quartz | 8.67 grams |
| Triple Superphosphate | 30.10 grams |
| KCl | 5.00 grams |

Triple or concentrated superphosphate is essentially monocalcium phosphate and is made by treating rock phosphate with phosphoric acid. It contains about 19% to 22% phosphorous (44 to 52% $P_2O_5$) and up to 3% sulfur. A portion of this batch was smelted at 1325°C and another portion at 1350°C. The material smelted at 1325°C was slightly opalescent, while that smelted at 1350°C was clear and homogenous. The glasses smelted at both temperatures were fluid enough for roll-quenching. Both resulting glasses were dry-ground and grains of −200+325 mesh were separated by water-washing and drying. Extractioon tests were performed at pH values of 5.7 and 8.0 with a sample size of 0.2 grams using the procedure previously described. The results are shown in Table B in which the zinc extraction is given as weight percent of the sample tested.

TABLE B

Zinc Extractabilities (Wt.%) From 0.2 gm Samples of −200+325 Mesh Grains at Specified pH Values

| Material | pH 5.7 | pH 8.0 |
|---|---|---|
| 1325°C smelt | 22.5% | 26.9% |
| 1350°C smelt | 44.4% | 6.9% |

EXAMPLES 3 to 6

Additional batch recipes are given in Table C. All batches were smelted at 1325°C, and all needed a stirring to incorporate floating material into the melt. The frits became more easily fusible as the replacement of quartz by alkali proceeded. No metallic zinc was observed either in the melt or in the rolled flake frit.

TABLE C

Batch Weight Recipes for 40% Zn Glasses Using Unroasted, Ground Zinc

| Example | 3 | 4 | 5 | 6 |
|---|---|---|---|---|
| Zinc Oxide | 57.0 | 57.0 | 57.0 | 57.0 |
| Triple Superphosphate | 30.1 | 30.1 | 33.8 | 30.1 |
| Ground Quartz | 8.7 | 3.7 | — | — |
| KCl | 5.0 | 5.0 | 5.0 | 8.7 |
| NaNO$_3$ | — | 13.7 | 13.7 | 13.7 |

The rolled flake products were dry-milled and −200+325 mesh grains were prepared for extraction testing, the results of which are shown in Table D.

TABLE D

Zinc Extractability (Wt. %)

| Example | pH 5.7 | pH 8.0 |
|---|---|---|
| 3 | 14.4 | 2.5 |
| 4 | 21.3 | 6.9 |
| 5 | 22.5 | 5.0 |
| 6 | 22.5 | 6.3 |

EXAMPLES 7 THROUGH 14

Additional batch recipes for phosphate-zinc oxide glasses are given in the following Table E.

TABLE E

Batch Weight Recipes for 40% Zn Frits

| Example | 7 | 8 | 9 | 10 | 11 | 12 | 13 | 14 |
|---|---|---|---|---|---|---|---|---|
| Zinc Oxide | 50.0 | 50.0 | 50.0 | 50.0 | 50.0 | — | — | — |
| Impure Zinc Oxide | — | — | — | — | — | 57.1 | 57.1 | 57.1 |
| Triple Superphosphate | — | 10.0 | 20.0 | 30.0 | 25.0 | 30.0 | 25.0 | 20.0 |
| KCl | 10.0 | 10.0 | 10.0 | 10.0 | 10.0 | 5.0 | 5.0 | 5.0 |
| 85% H$_3$PO$_4$ (Aqueous) | 65.0 | 48.8 | 32.5 | 16.25 | 24.4 | 14.3 | 22.4 | 30.5 |
| [ ≡ P$_2$O$_5$] | 40.0 | 30.0 | 20.0 | 10.0 | 15.0 | 8.8 | 13.8 | 18.8 |

The batches for Examples 7 through 11 reacted vigorously in the early stages, with much heat being evolved, and a slow but continuing production of hydrogen gas. The batches of Examples 12, 13, and 14 were formulated with zinc oxide in order to speed the batch-forming reaction by eliminating the relatively slow metal/acid interaction. Example 6 reacted very rapidly and was solid (i.e. dry) in about 30 seconds. Example 7 was slower, the damp crumb stage being reached in a few minutes, while Example 8 took several hours to solidify sufficiently for smelting. The last three batches were smelted at 1225°–1250°C and the frits were ready to pour in about 20 minutes. The samples of roll-quenched flake were dry-ground, graded grains −200+325 mesh prepared and extraction tests performed. The results are given in Table F. All are good.

TABLE F

Zinc Extractability (Wt.%) on −200+325 Mesh Grains (0.2 gm) of 40% Zn Frits

| Example | pH 5.7 | pH 8.0 |
|---|---|---|
| 12 | 27.5 | 4.4 |
| 13 | 21.5 | 5.6 |
| 14 | 17.8 | 4.1 |

EXAMPLE 15

Examples 15 through 24 illustrate phosphate-copper oxide glasses. A glass was prepared having this batch recipe:

| | |
|---|---|
| CuO | 50 grams |
| Monoammonium Phosphate | 94 grams |
| K$_2$CO$_3$ | 7.3 grams |

The batch melted to a fluid liquid at 900°C to 1000°C, and when roll-quenched a black glass resulted having a coppery or gold sheen on the surface. The glass was dry ground for two hours and submitted for extraction testing, a 0.2 gram sample being used. At both pH 5.7 and pH 8.0, 33% of the copper was extracted in 16 hours.

EXAMPLES 16 AND 17

Another glass was prepared having this batch recipe:

| | |
|---|---|
| CuO | 56.1 grams |
| Monoammonium Phosphate | 94 grams |
| KNO$_3$ | 10.7 grams |

In place of the KNO$_3$, 7.3 grams of K$_2$CO$_3$ was used in another glass preparation. In each case, the glass was ground, then sieved and washed between 200 and 325 mesh. A 0.2 gram sample was submitted for extraction by the usual test procedures. At pH 5.7, 31.9% copper was extracted, while at pH 8, 30.6% copper was extracted for each glass.

EXAMPLE 18

In place of the monoammonium phosphate of Examples 16 and 17, the batch of this example used sodium tripolyphosphate as follows:

| | |
|---|---|
| Copper Oxide | 51.25 grams |
| Sodium Tripolyphosphate | 27.10 grams |
| Powdered Quartz | 19.79 grams |
| Sodium Nitrate | 4.85 grams |

After smelting a batch of this formulation, half of the resulting glass was roll-quenched, and half was water-quenched. Each type of frit so produced was crushed roughly and graded by dry-sieving into various sized fractions. Each fraction was extraction-tested at pH values of 5.7 and 8.0, the standard weight of 0.2 gram being used throughout. The results are shown in Table G.

TABLE G

Copper Extractabilities
(Wt.%) on Various Size Fractions of 40% Cu Frit
in Both Roll-Quenched and Water-Quenched Forms

| Size | Roll-Quenched Frit | | Water-Quenched Frit | |
| Fraction | pH 5.7 | pH 8.0 | pH 5.7 | pH 8.0 |
|---|---|---|---|---|
| −7+10 | 5.6 | 7.5 | 6.9 | 12.8 |
| −10+14 | 6.9 | 10.4 | 7.5 | 13.4 |
| −14+20 | 8.1 | 14.4 | 10.4 | 15.3 |
| −20+35 | 9.4 | 17.5 | 14.4 | 18.8 |
| −35+48 | 22.2 | 20.9 | 21.6 | 28.1 |

EXAMPLES 19 THROUGH 22

Table H provides batch recipes, analyses, and extraction results for four additional examples.

TABLE H

Batch Weight Recipes,
Theoretical Analyses and Extraction Results
(Wt.% Cu) on −16+30 Mesh Frit Grains of 40% Cu Frits

| | Example | 19 | 20 | 21 | 22 |
|---|---|---|---|---|---|
| Batch Recipe | CuO | 51.25 | 51.25 | 51.25 | 51.25 |
| | $K_2CO_3$ | 7.3 | 7.3 | 14.6 | 11.0 |
| | $K_2SO_4$ | — | 5.0 | — | 2.5 |
| | 85% $H_3PO_4$ (Aqueous) | 73.2 | 65.0 | 65.0 | 65.0 |
| Theoretical Analysis | CuO | 50.0 | 50.0 | 50.0 | 50.0 |
| | $K_2O$ | 5.0 | 5.0 | 10.0 | 7.5 |
| | $K_2SO_4$ | — | 5.0 | — | 2.5 |
| | $P_2O_5$ | 45.0 | 40.0 | 40.0 | 40.0 |
| Extr. | pH 5.7 | | 10.9 | 14.1 | 12.2 |
| | pH 8.0 | | 16.6 | 25.0 | 16.3 |

All these glasses smelted to a homogenous fluid in about 15 to 20 minutes at 1225°C. The rolled frits were good black glasses. The glasses of Examples 20, 21, and 22 were graded at −16+30 mesh and were extracted as before. The extraction results are also shown in Table H and were quite good.

EXAMPLES 23 and 24

The glasses of these examples had higher copper contents than those of Examples 19 through 22. Table I provides batch recipes, copper contents, and extraction values of these glasses.

TABLE I

Batch Weight Recipes,
Theoretical Cu Contents and Extraction Behavior on
−200+325 Mesh Grains of High Copper Content Frits

| Example | 23 | 24 |
|---|---|---|
| CuO | 56.2 | 62.5 |
| $K_2CO_3$ | 7.3 | 7.3 |
| 85% $H_3PO_4$ | 63.0 | 52.8 |
| % Cu | 45 | 50 |
| pH 5.7 extraction | 37.5 | 35.0 |
| pH 8.0 extraction | 32.5 | 31.2 |

Both batches melted easily to fluid liquids at 1200°C. The frits produced from the glasses of these two examples were crushed and graded at −200+325 mesh and extraction tests carried out in the same manner as previously described.

EXAMPLE 25

Examples 25 through 34 illustrate phosphate-manganese oxide glasses. A glass was prepared from this formulation:

| | |
|---|---|
| Manganese dioxide | 63.7 grams |
| $H_3BO_3$ | 28.2 grams |
| Sodium tripolyphosphate | 39.0 grams |

The melt obtained from this batch was quite fluid at 1100°C. There was complete solution of the manganese dioxide and only a tract of crystallization on cooling. The glass was fritted and dry-ground. Extraction tests were then performed at pH values of 5.7 and 8.0 on sieved but unwashed grains at 200–325 mesh. All of these tests indicated good solubility as shown in Table J.

TABLE J

| Time Extracted | pH | ppm Mn in Solution | % of Sample Extracted |
|---|---|---|---|
| 16 hr. | 5.7 | 465 | 2.32 |
| 16 hr. | 8.0 | 416 | 2.08 |
| 8 hr. | 5.7 | 133 | 0.67 |
| 8 hr. | 8.0 | 63 | 0.30 |
| 4 hr. | 5.7 | 330 | 1.65 |
| 4 hr. | 8.0 | 80 | 0.40 |

EXAMPLES 26 THROUGH 30

Previously, the oxidation state of manganese has not been a matter of concern in agronomy. However, data obtained in the development of the present glasses show that $Mn^{2+}$ was more desirable as a nutrient than $Mn^{3+}$, because the former has greater solubility. Two approaches to a manganous frit were made, firstly, by reduction of $MnO_2$ and secondly, by the use of manganous carbonate with additional reduction. Weight batches used are shown in Table K.

TABLE K

| Example | 26 | 27 | 28 | 29 | 30 |
|---|---|---|---|---|---|
| $MnO_2$ | 63.7 | 63.7 | — | — | — |
| $MnCO_3$ | — | — | 73.2 | 73.2 | 73.2 |
| $H_3BO_3$ | 28.2 | 28.2 | 28.2 | 28.2 | 28.2 |
| STPP | 39.0 | 39.0 | 39.0 | 39.0 | 39.0 |
| Starch | 5.0 | 10.0 | — | 2.5 | 5.0 |

Herein the designation "STPP" means sodium tripolyphosphate. The two manganese dioxide-based frits melted easily but left a small residue of undissolved material when the melt was poured. The roll-flake made from this glass was opaque. While these glasses were useful as herein contemplated, a substantial part of the manganese was still in the trivalent state.

Frits made with the batches containing manganese carbonate gave a brown rolled flake, indicating the presence of only a little $Mn^{3+}$. Both levels of starch (used as a reducing agent) gave lighter ground products, showing a quite low $Mn^{3+}$ content. A glass made from the batch of Example 29 was melted and ground. An extraction test showed that the glass of this example had low solubility on the wash grains used which measured 200–325 mesh. Table L shows the results.

TABLE L

| Time Extracted | Buffer pH | ppm Mn in Solution | % of Sample Extracted |
|---|---|---|---|
| 16 hrs. | 5.7 | 198 | 1.0 |
| 16 hrs. | 8.0 | 96 | 0.5 |
| 8 hrs. | 5.7 | 192 | 1.0 |
| 8 hrs. | 8.0 | 124 | 0.6 |
| 4 hrs. | 5.7 | 156 | 0.8 |
| 4 hrs. | 8.0 | 148 | 0.7 |

EXAMPLE 31

A glass was prepared having the following composition in mole percent:

| | |
|---|---|
| MnO | 45% |
| $K_2O$ | 5% |
| $P_2O_5$ | 50% |

In the preparation of this glass, starch was used in an amount of 5% by weight of the batch as a reducing agent, and the manganese was introduced as the carbonate. The batch melted easily at 1100°C, and when rolled into flake the resulting glass was transparent and had a very pale rose tint, indicative of complete reduction of the manganese to the $Mn^{2+}$ state. A sample of 200–325 mesh, washed grains was tested for solubility. The results showed 0.44% extraction at pH 5.7 and 0.56% extraction at pH 8.0. The water extract pH was 4.2.

EXAMPLES 32 THROUGH 34

Three batches were prepared in which the $K_2O$ contents were 5%, 10%, and 15%, respectively, the $P_2O_5$ content being adjusted to compensate. All batches melted easily at 1250°C and yielded good, well reduced glasses on roll-quenching. Samples of grains measuring −200+325 mesh were prepared and tested for extraction behavior at pH values of 5.7 and 8.0. Details of the batch mixes and extraction data are given in Table M. Herein the term "MAP" means monoammonium phosphate.

TABLE M

Batch Mixes by Weight and Extractabilities of 35% $Mn^{2+}$ Frits Made Using $MnCO_3$ and Starch Reduction

| | Example | 32 | 33 | 34 |
|---|---|---|---|---|
| Batch | $MnCO_3$ | 73.2 | 73.2 | 73.2 |
| | MAP | 80.7 | 72.6 | 64.5 |
| | $K_2CO_3$ | 7.3 | 14.6 | 21.9 |
| | Starch | 5.0 | 5.0 | 5.0 |
| | MnO | 45.2 | 45.2 | 45.2 |
| Wt. % | $K_2O$ | 5.0 | 10.0 | 15.0 |
| | $P_2O_5$ | 49.8 | 44.8 | 39.8 |
| Extr. (wt. % Mn) | pH 5.7 | 6.0 | 9.3 | 17.5 |

TABLE M-continued

Batch Mixes by Weight and Extractabilities of 35% $Mn^{2+}$ Frits Made Using $MnCO_3$ and Starch Reduction

| Example | 32 | 33 | 34 |
|---|---|---|---|
| pH 8.0 | 3.4 | 4.0 | 2.3 |

EXAMPLES 35 THROUGH 41

Examples 35 through 45 illustrate phosphate-molybdenum oxide glasses. Glasses were prepared from the seven batch recipes of Table N.

TABLE N

Batch Weight Recipes for Various 20% Mo Micronutrient Frits and Solubility Test Results

| Example | 35 | 36 | 37 | 38 | 39 | 40 | 41 |
|---|---|---|---|---|---|---|---|
| TTPP | 9 | 10 | 10 | 10 | — | — | — |
| STPP | — | — | — | — | 50 | 40 | 30 |
| Hygrade | 30 | 25 | 20 | 15 | 20 | 30 | 40 |
| $MoO_3$ | 30 | 30 | 30 | 30 | 30 | 30 | 30 |
| MAP | 50.3 | 60.0 | 68.1 | 76.2 | — | — | — |
| Extraction (% Mo) | 0.5 | 0.5 | 0.6 | 0.6 | 10.4 | 4.7 | 2.7 |

The term "TPPP" means tetrapotassium pyrophosphate. As previously indicated, "STPP" means sodium tripolyphosphate. The term "Hygrade" is a trademark for a product of the Olin Corporation and has this general analysis in weight percent:

| | |
|---|---|
| $P_2O_5$ | 43% |
| CaO | 13% |
| $Fe_2O_3$ | 12% |
| $Al_2O_3$ | 8% |
| $Na_2O$ | 7% |
| $H_2O$ | 2% |

The balance of the composition of the Hygrade product is loss on ignition. The batches of Examples 35 through 38 melted satisfactorily in 30 minutes at 1200°C, that of Example 35 being the most fluid and that of Example 38 being the least fluid. the fluidity apparently is proportional to the amount of the Hygrade product and inversely proportional to the total $P_2O_5$ content of the frit. The batches of Examples 39 through 41 melted easily in 25 minutes at 1250°C.

Extraction tests in distilled water were performed on Examples 39 through 41, the "as-ground" powder being used, that is, without separating the ground frit as to particle sizes. The extraction data is also given in Table N.

EXAMPLES 42 THROUGH 45

Four additional glasses were prepared from the following formulations. Frit prepared from these examples was ground with mortar and pestle and sieved to −200+325 mesh. Samples were then extracted in water for 16 hours. The formulations and extraction results are shown in Table O. The first extraction percentage is that of molybdenum based on the weight of the glass. The second extraction percentage is that of molybdenum based on the weight of molybdenum present.

TABLE O

| | Phosphate-$MoO_3$ Glasses | | | |
|---|---|---|---|---|
| Example | 42 | 43 | 44 | 45 |
| $MoO_3$ | 45 | 45 | 45 | 45 |
| Hygrade | 20 | 25 | 20 | 20 |

TABLE O-continued

| Example | Phosphate-MoO₃ Glasses | | | |
|---|---|---|---|---|
| | 42 | 43 | 44 | 45 |
| STPP | 35 | 30 | 30 | 25 |
| CaCO₃ | — | — | 9 | 9 |
| NaCO₃ | — | — | — | 85 |
| % Mo Extracted | 7.98 | 3.04 | 8.28 | 25.41 |
| T of Total Mo | 26.6 | 10.1 | 27.6 | 84.7 |

EXAMPLES 46 THROUGH 54

Examples 46 through 59 illustrate phosphate-boron oxide glasses. These glasses are normally readily soluble in water, the problem being to reduce their solubility to a degree where the glasses are useful as a soil nutrient with relatively slow release of boron.

The water-solubility test for the phosphate-boron glasses was therefore somewhat different to that used for the other micronutrient element frits described herein. The granular boron frit was extracted with distilled water for 16 hours and the boron in the solution then estimated by the quinalizarin method.

Table P lists batch recipes for nine examples in which three coloring oxides were used at relatively low levels to obtain distinctive colors and also to check whether the colorant had any effect on the boron extractability of the frit. All batches smelted in 30 minutes at 1100°C with one stirring at 20 minutes. Frits obtained from a colorant of $MnO_2$ were quite dark; those obtained with a colorant of $Fe_2O_3$ showed a color change from light to darker brown as the amount of the Hygrade component was increased; while those obtained with a colorant of CoO changed from blue to greenish blue as the Hygrade product was increased in amount. Grains measuring −16+30 mesh were tested by the extraction method reserved for the phosphate-boron oxide glasses, the results also being shown in Table P.

TABLE P

| | Batch Weight Recipes and Extraction Test Results on Granular, Colored Boron Frits Based on Borax and Hygrade Product | | | | | | | | |
|---|---|---|---|---|---|---|---|---|---|
| | MnO₂ Series | | | Fe₂O₃ Series | | | CoO Series | | |
| Example | 46 | 47 | 48 | 49 | 50 | 51 | 52 | 53 | 54 |
| Hygrade | 10 | 15 | 20 | 10 | 15 | 20 | 10 | 15 | 20 |
| FM Borax | 88 | 83 | 78 | 88 | 83 | 78 | 90 | 85 | 80 |
| MnO₂ | 2 | 2 | 2 | — | — | — | — | — | — |
| Fe₂O₃ | — | — | — | 2 | 2 | 2 | — | — | — |
| CoO | — | — | — | — | — | — | 0.1 | 0.1 | 0.1 |
| Theoretical B (wt. %) | 17.6 | 16.6 | 15.6 | 17.6 | 16.6 | 15.6 | 18.0 | 17.0 | 15.9 |
| Extracted B (wt %) | 17.8 | 11.0 | 10.0 | 16.9 | 10.0 | 8.0 | 18.5 | 10.3 | 8.1 |

Considering that commercial borax of the same grain size would dissolve completely in a few minutes in water under the conditions of the test, a 50% extraction of available boron in 16 hours indicates a relatively insoluble material.

EXAMPLES 55 AND 56

The batch recipes for these examples consisted essentially of borax and the Hygrade product (note Examples 35 through 41) as shown in the following Table Q.

TABLE Q

| Batch Weight Recipes for Borax/Hygrade Frits | | |
|---|---|---|
| Example | 55 | 56 |
| Borax | 65.0 | 75.0 |
| Hygrade | 41.0 | 29.4 |

TABLE Q-continued

| Batch Weight Recipes for Borax/Hygrade Frits | | |
|---|---|---|
| Example | 55 | 56 |
| % B in Glass | 13.3 | 15.0 |

Both batches melted and were homogenous in 20 minutes at 1250°C. After roll-quenching, the frits were dry-ground and tested in this "as ground" state. These glasses yielded about 5% boron on extraction as compared to an average amount of about 14% boron actually present.

EXAMPLES 57 THROUGH 59

A series of three melts were made in which the Hygrade product was used at 10%, 15%, and 20% levels, respectively. A boron content of about 20% of the finished frit was obtained by proportioning anhydrous boric acid and borax. A small amount of $MnO_2$ was added to provide color. The batch recipes and extraction data are shown in Table R.

TABLE R

| Batch Weight Recipes for 20% B Frits containing Hygrade and MnO₂ | | | |
|---|---|---|---|
| Example | 57 | 58 | 59 |
| Hygrade | 11.7 | 17.6 | 23.5 |
| MnO₂ | 2.0 | 2.0 | 2.0 |
| Borax | 62.6 | 53.1 | 40.0 |
| Anhydrous Boric Acid | 25.4 | 29.9 | 38.0 |
| Extraction % —B | 14.5 | 13.5 | 13.0 |

All batches melted quickly and easily at 1100°C, 15 to 25 minutes being sufficient. The glasses of Examples 57 and 58 had a deep reddish-brown color, while the glass of Example 59 was much lighter. The frits were crushed and graded −16+30 mesh, no water-washing being used prior to the distilled water extraction test.

For comparison, the percent boron extracted from borax by the same test was 20.8% based on the weight of the sample.

The chief advantages of the present glasses include:

1. They have good metal nutrient solubility in aqueous media, including an aqueous media of alkaline pH;
2. They provide an acid extract in water. This creates a less alkaline and even acid microenvironment around each frit particle in a soil, enabling more efficient pickup of the nutrient metal by the plant;
3. They provide a good source of nutrient metal in adequate amounts; and
4. They are stable, easily melted glasses having a low overall cost.

As used here and in the claims, the term "plants" or seeds thereof are taken to mean plants or their seeds which become rooted in soil during growth and which obtain nutrients from that soil. The major crops showing a response to micronutrient iron are the citrus fruits, corn, nuts, grass, rice, soy beans, sorghum, and still other vegetables. The growth of still many other plants is enriched by use of the present glass compositions.

It is understood that still other ingredients than those named may be present in these glasses without unduly adversely affecting their advantages. Normally, impurities are present in trace amounts, but up to ten percent by weight of impurities may be tolerated in most cases. Impurities are usually other oxides, such as one or more of $SiO_2$, CaO, $TiO_2$, $B_2O_3$, $Al_2O_3$, CoO, CuO, $Fe_2O_3$, MgO, $MnO_2$, but other types of impurities may also be present. Some colorants, usually oxides, may also be added to the glasses to impart a desired identifying color.

Although the foregoing described several embodiments of the present invention, it is understood that the invention may be practiced in still other forms within the scope of the following claims.

I claim:

1. A glass composition adapted in comminuted form to act as a micronutrient in both acidic and alkaline soils consisting essentially of a nonoxidizing phosphate base glass containing a nutrient amount of a micronutrient metal oxide to nourish plant and seed growth in such acidic or alkaline soils, said micronutrient metal oxide being selected from the group consisting of the oxides of copper, manganese, molybdenum, boron, and mixtures thereof, and a sufficient amount of a metal control agent to control the water solubility of said glass composition and provide a water-extraction of said micronutrient metal oxide from said phosphate base glass at a rate within a predetermined range, said metal control agent being $R_2O$ or RCl or mixtures thereof, in which R is potassium or sodium, provided that when the micronutrient metal is manganese, no more than 50% by weight of $R_2O$ or RCl is $Na_2O$ or NaCl.

2. The glass composition of claim 1 in which said metal oxide micronutrient is manganese oxide.

3. The glass composition of claim 1 consisting essentially in weight percent of about:

|  | Percent |
| --- | --- |
| $P_2O_5$ | 30 to 55 |
| MnO | 30 to 70 |
| Control Agent | 0.5 to 15. |

4. The glass composition of claim 1 in which said metal oxide micronutrient is copper oxide.

5. The glass composition of claim 1 consisting essentially in weight percent of about:

|  | Percent |
| --- | --- |
| $P_2O_5$ | 25 to 65 |
| Copper Oxide | 30 to 65 |
| Control Agent | 5 to 10. |

6. The glass composition of claim 1 in which said metal oxide micronutrient is molybdenum oxide.

7. The glass composition of claim 1 consisting essentially in weight percent of about:

|  | Percent |
| --- | --- |
| $P_2O_5$ | 20 to 60 |
| Molybdenum Oxide | 10 to 35 |
| Control Agent | 15 to 30. |

8. The glass composition of claim 7 in which said control agent includes up to 10% by weight of CaO.

9. The glass composition of claim 1 in which said metal oxide micronutrient is boron oxide.

10. The glass composition of claim 1 consisting essentially in weight percent of about:

|  | Percent |
| --- | --- |
| $P_2O_5$ | 5 to 20 |
| $B_2O_3$ | 30 to 65 |
| First Control Agent | 15 to 30 |
| Second Control Agent | 5 to 20 | said first control agent being $R_2O$ or RCl or mixtures thereof, in which R is potassium or sodium, and said second control agent being CaO or $SiO_2$ or mixtures thereof.

11. A process for preparing a micronutrient glass adapted to be added to soil to enrich the life of plants and seeds planted therein, comprising: preparing a non-oxidizing phosphate base glass containing in oxide form a nutrient amount of a micronutrient metal to nourish plant and seed growth in such soil, said micronutrient metal oxide being selected from the group consisting of the oxides of copper, manganese, molybdenum, boron, and mixtures thereof, and controlling the water-solubility of the glass by including in the glass a sufficient amount of a metal control agent to provide a water-extraction of said micronutrient metal oxide from said phosphate base glass at a rate within a predetermined range, said metal control agent being $R_2O$ or RCl or mixtures thereof, in which R is potassium or sodium, provided that when the micronutrient metal is manganese, no more than 50% by weight of $R_2O$ or RCl is $Na_2O$ or NaCl.

12. A process for enriching the life of plants and seeds thereof planted in soil comprising adding to said soil a comminuted glass comprising a nonoxidizing phosphate base glass containing in oxide form a nutrient amount of a micronutrient metal to nourish said plant and seed growth in such soil, said micronutrient metal oxide being selected from the group consisting of the oxides of copper, manganese, molybdenum, boron, and mixtures thereof, and a sufficient amount of a metal control agent to control the water-solubility of said glass and provide a water-extraction of said micronutrient metal oxide from said phosphate base glass at a rate within a predetermined range, said metal control agent being $R_2O$ or RCl or mixtures thereof, in which R is potassium or sodium, provided that when the micronutrient metal is manganese, no more than 50% by weight of $R_2O$ or RCl is $Na_2O$ or NaCl.

13. The process of claim 12 in which said soil has an acidic pH.

14. The process of claim 12 in which said soil has an alkaline pH.

15. The process of claim 12 in which said soil is alkaline, and said glass composition is adapted to form an aqueous acid extract containing the micronutrient metal oxide, and including leaching said glass with water to provide a less alkaline microenvironment adjacent said plants and seeds in said alkaline soil and thereby facilitate assimilation by the plants and seeds of said micronutrient metal oxide.